(12) United States Patent
Col et al.

(10) Patent No.: US 6,931,517 B1
(45) Date of Patent: Aug. 16, 2005

(54) POP-COMPARE MICRO INSTRUCTION FOR REPEAT STRING OPERATIONS

(75) Inventors: Gerard M. Col, Austin, TX (US); G. Glenn Henry, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 467 days.

(21) Appl. No.: 10/279,212

(22) Filed: Oct. 22, 2002

Related U.S. Application Data (60) Provisional application No. 60/345,449, filed on Oct. 23, 2001.

(51) Int. Cl.[7] .......................... G06F 9/305; G06F 9/34
(52) U.S. Cl. .................. 712/223; 712/202; 712/205; 712/241; 711/218; 711/219; 711/132; 711/214
(58) Field of Search ............................. 712/202, 205, 712/223, 241; 711/132, 214, 218, 219

(56) References Cited

U.S. PATENT DOCUMENTS

| | | | | |
|---|---|---|---|---|
| 4,885,682 A | * | 12/1989 | Komoto .................... 712/236 |
| 5,041,968 A | * | 8/1991 | Yamaguchi ................ 712/208 |
| 5,359,718 A | | 10/1994 | Phillips et al. |
| 5,404,473 A | * | 4/1995 | Papworth et al. ............ 712/241 |
| 5,692,146 A | * | 11/1997 | Yamamoto et al. .......... 711/200 |
| 5,822,602 A | * | 10/1998 | Thusoo .......................... 712/1 |
| 6,032,252 A | * | 2/2000 | Petro et al. ................ 712/233 |
| 6,338,136 B1 | | 1/2002 | Col et al. |
| 6,442,673 B1 | * | 8/2002 | Col et al. ................... 712/202 |
| 6,629,234 B1 | * | 9/2003 | Col ............................. 712/219 |

* cited by examiner

Primary Examiner—William M. Treat
(74) Attorney, Agent, or Firm—Richard K. Huffman; James W. Huffman (57) ABSTRACT

A microprocessor apparatus is provided for performing a pop-compare operation. The microprocessor apparatus includes paired operation translation logic, load logic, and execution logic. The paired operation translation logic receives a macro instruction that prescribes the pop-compare operation, and generates a pop-compare micro instruction. The pop-compare micro instruction directs pipeline stages in a microprocessor to perform the pop-compare operation. The load logic is coupled to the paired operation translation logic. The load logic receives the pop-compare micro instruction, and retrieves a first operand from an address in memory, where the address is specified by contents of a register. The register is prescribed by the pop-compare micro instruction. The execution logic is coupled to the load logic. The execution logic receives the first operand, and compares the first operand to a second operand.

25 Claims, 3 Drawing Sheets

*Repeating String Compare Operation*

| CYCLE | FETCH | TRANSLATE | REGISTER | ADDRESS | DATA/ALU | WRITE BACK | |
|---|---|---|---|---|---|---|---|
| 1 | REPE CMPSD | --- | --- | --- | --- | --- | |
| 2 | STALL | POP T1,[ESI] | --- | --- | --- | --- | |
| 3 | STALL | POP T2,[EDI] | POP T1,[ESI] | --- | --- | --- | |
| 4 | STALL | CMP T2,T1 | POP T2,[EDI] | POP T1,[ESI] | --- | --- | |
| 5 | STALL | DEC ECX | CMP T2,T1 | POP T2,[EDI] | POP T1,[ESI] | --- | |
| 6 | STALL | POP T1,[ESI] | DEC ECX | CMP T2,T1 | POP T2,[EDI] | POP T1,[ESI] | |
| 7 | STALL | POP T2,[EDI] | POP T1,[ESI] | DEC ECX | CMP T2,T1 | POP T2,[EDI] | 3 CYCLES |
| 8 | STALL | CMP T2,T1 | POP T2,[EDI] | POP T1,[ESI] | DEC ECX | CMP T2,T1 | |
| 9 | STALL | DEC ECX | CMP T2,T1 | POP T2,[EDI] | POP T1,[ESI] | DEC ECX | |
| 10 | STALL | POP T1,[ESI] | DEC ECX | CMP T2,T1 | POP T2,[EDI] | POP T1,[ESI] | |
| 11 | STALL | POP T2,[EDI] | POP T1,[ESI] | DEC ECX | CMP T2,T1 | POP T2,[EDI] | 3 CYCLES |
| 12 | STALL | CMP T2,T1 | POP T2,[EDI] | POP T1,[ESI] | DEC ECX | CMP T2,T1 | |
| 13 | STALL | DEC ECX | | | | | |

*Paired Pop-Compare Operation*

POP-COMPARE MICRO INSTRUCTION FOR REPEAT STRING OPERATIONS

CROSS-REFERENCE TO RELATED APPLICATIONS

This application claims the benefit of U.S. Provisional Patent Application Ser. No. 60/345,449, filed on Oct. 23, 2001.

BACKGROUND OF THE INVENTION

1. Field of the Invention

This invention relates in general to the field of microelectronics, and more particularly to apparatus in a pipeline microprocessor for efficiently performing string scan and compare operations.

2. Description of the Related Art

Early microprocessors executed one instruction at a time. Accordingly, each individual instruction was fetched from memory and all of the functions prescribed by the instruction were executed by functional units within the microprocessors until all the functions were completed. At that point, the individual instruction was retired and a next instruction was fetched from memory for execution.

Although execution of program instructions in an early microprocessor was simple to understand, the practical affect of their execution was quite slow. Since that time, microprocessor designers have repeatedly focused on modifying the architecture of microprocessors to improve the execution speed, or throughput, of instructions. More recently, pipeline architectures have prevailed in the art as a means for increasing instruction throughput. A pipeline architecture breaks down the functional units of a microprocessor into a sequence of successive operations, very much analogous to the staging of an assembly line. Accordingly, it is possible—and highly desirable from a throughput standpoint—that a particular stage of the microprocessor is performing an operation prescribed by a first instruction while a stage immediately preceding the particular stage is performing another operation prescribed by a second instruction that follows the first instruction in an application program. Efficient throughput in a microprocessor is attained when all pipeline stages are performing operations. Problems of inefficiently occur when a particular pipeline stage takes too long to perform its prescribed operation. In this circumstance, a stall signal is issued to preceding pipeline stages that force them to hold until the particular pipeline stage completes its function.

Pipeline architectures have continued to evolve to the point that many operations that are prescribed by program instructions (also called macro instructions) can be accomplished in a single traversal of the pipeline. For example, a register-to-register add operation is accomplished by retrieving two register operands simultaneously from registers within a register stage, adding the two operands together to produce a result in a following execution stage, and finally writing the result back to a result register in a result write back stage that follows the execution stage. A single instruction to perform the register—register add operation is thus configured to propagate through successive pipeline stages in synchronization with a pipeline clock, and the end outcome is that a user experiences register-to-register addition in a single pipeline cycle.

Although the operations prescribed by many macro instructions can be executed in a single traversal through the pipeline, there remain numerous instructions whose prescribed operations are so complex that they cannot be executed in a single traversal. One such class of macro instructions are the so-called string compare instructions, such as a scan string instruction or a compare string instruction. This class of instructions indirectly prescribes the location of one or two operands, which must be retrieved from data memory and compared to one another or two a third operand stored in an internal register to generate a comparison result. This type of operation is known as a load-compare operation. Yet, most present day microprocessors have a particular pipeline stage that is capable either of 1) accessing operands in memory or 2) performing an arithmetic or logical computation using provided operands. Consequently, both of these types of operations cannot be performed during the same pipeline cycle within that particular stage. Accordingly, a load-compare operation requires that two sub-operations be performed. First, the operand(s) must retrieved from memory. Following this, the retrieved operand(s) must be compared to generate the result. Hence fetching of subsequent instructions must be stalled while the operation to retrieve the operand(s) (i.e., the first sub-operation) from memory is provided. When the addition operation (i.e., the second sub-operation) is provided, fetching is allowed to resume.

Stalling the pipeline for one or more cycles is disadvantageous from a throughput perspective. And a single load-compare operation results in at least one pipeline stall. But when string compare macro instructions are employed iteratively many times over, as is typically seen within many application programs, the disadvantages caused by stalls during a single iteration of a string compare operation are furthermore exacerbated in proportion to the number of prescribed iterations.

Any type of operation in a pipeline microprocessor that requires multiple pipeline cycles to accomplish is problematic in that inefficient utilization of the pipeline stages is experienced. When this inefficient utilization is compounded by iterative situations, the execution speed of a microprocessor suffers. Therefore, what is needed is an apparatus in a microprocessor that enables a load-compare operation to be accomplished in a single pipeline cycle.

SUMMARY OF THE INVENTION

The present invention, among other applications, is directed to solving these and other problems and disadvantages of the prior art. The present invention provides a superior technique for accomplishing load-compare and pop-compare operations in a pipeline microprocessor. In one embodiment, a microprocessor apparatus is provided for performing a pop-compare operation. The microprocessor apparatus includes paired operation translation logic, load logic, and execution logic. The paired operation translation logic receives a macro instruction that prescribes the pop-compare operation, and generates a pop-compare micro instruction. The pop-compare micro instruction directs pipeline stages in a microprocessor to perform the pop-compare operation. The load logic is coupled to the paired operation translation logic. The load logic receives the pop-compare micro instruction, and retrieves a first operand from an address in memory, where the address is specified by contents of a register. The register is prescribed by the pop-compare micro instruction. The execution logic is coupled to the load logic. The execution logic receives the first operand, and compares the first operand to a second operand.

One aspect of the present invention contemplates an apparatus in a microprocessor for executing a scan string instruction or a compare string instruction. The apparatus has a paired operation translator that is configured to translate the scan string instruction or the compare string instruction into corresponding micro instructions. The corresponding micro instructions include a pop-compare micro instruction directing the microprocessor to perform two operations, where the two operations are performed by two successive stages of the microprocessor. The two successive stages include a load stage and an execute stage. The load stage performs a first one of the two operations. The first one of the two operations includes retrieving a first operand from a location in memory. The execute stage is coupled to the load stage. The execute stage perform a second one of the two operations. The second one of the two operations includes receiving the first operand and comparing the first operand with a second operand to generate a result.

Another aspect of the present invention comprehends a mechanism in a pipeline microprocessor for performing a pop-compare operation. The mechanism has a pop-compare micro instruction and load logic. The pop-compare micro instruction corresponds to a macro instruction received and translated by translation logic. The load logic receives the pop-compare micro instruction, and retrieves a first operand from a memory location, and to provides the first operand to execution logic in a following stage of the pipeline microprocessor. The execution logic compares the first operand to a second operand to generate a comparison result in a single pipeline cycle.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion pertaining to the execution of load-compare operations in present day pipeline microprocessors, prior art examples will now be discussed with reference to FIGS. 1–2 that clearly illustrate limitations in conventional pipeline architectures that preclude efficient execution of load-compare and pop-compare operations. Following this, a description of the present invention is provided with reference to FIGS. 3–4. Within a microprocessor according to the present invention, the number of micro instructions (and commensurate pipeline cycles) required to perform pop-compare operations is cut in half for implementing scan string macro instructions and is reduced by ⅓ for implementing compare string instructions.

Figure 1:
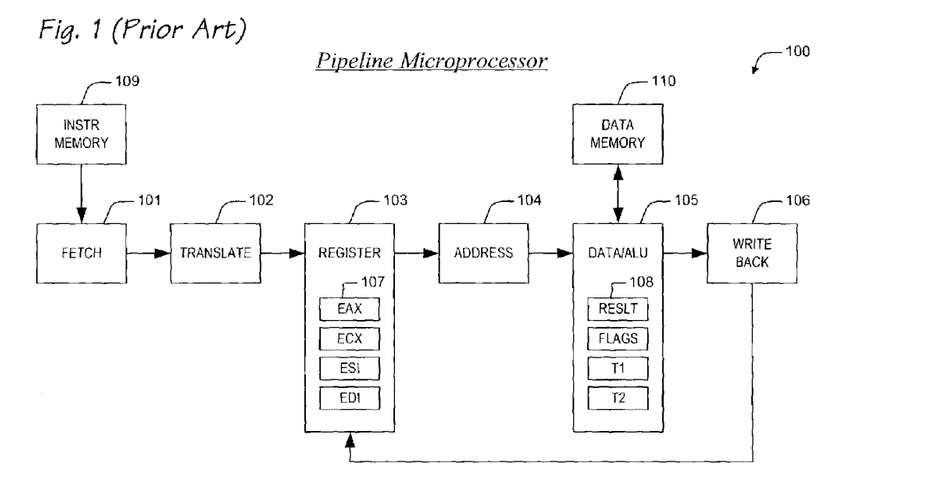
FIG. 1 is a block diagram illustrating pipeline stages of a prior art pipeline microprocessor.

Referring to FIG. 1, a block diagram is presented illustrating stages of a related art pipeline microprocessor 100. The microprocessor 100 includes a fetch stage 101, translate stage 102, register stage 103, address stage 104, data/ALU stage 105, and write back stage 106.

In operation, the fetch stage 101 retrieves macro instructions from external instruction memory 109 that are to be executed by the microprocessor 100. The translate stage 102 translates the fetched macro instructions into associated micro instructions. The register stage 103 retrieves operands specified by the micro instructions from a registers 107 within a register file for use by subsequent stages 104–106 of the pipeline. The address stage 104 generates memory addresses specified by the micro instructions to be used in data storage and retrieval operations. The data/ALU stage 105 either performs arithmetic, logical, or other prescribed operations to generate results using the operands retrieved from the registers 107; or accesses the external data memory 110 to store or retrieve memory operands using the addresses generated in the address stage 104. The data/ALU stage 105 may employ registers 108 for storing of operands (i.e., registers T1 and T2), and may also provide results in a result register RESLT, and may additional update a flags register FLAGS to indicate certain properties (e.g., a zero flag to indicate a result of zero, etc.) of the contents of RESLT. The write back stage 106 updates registers 107 in the register file with the results generated or obtained from the data memory 110 in the data/ALU stage 106. Micro instructions proceed in sequence through each successive stage of the pipeline in synchronization with a pipeline clock signal (not shown). To achieve optimum pipeline performance, while a given micro instruction is executing in a given stage of the pipeline, a preceding micro instruction should be executing in a subsequent pipeline stage and a following micro instruction should be executing in a previous pipeline stage. In other words, during any given pipeline cycle, all stages 101–106 of the microprocessor 100 should be performing their architected functions; no stage should be idle.

But optimum pipeline throughput is rarely attained because many of the operations that are prescribed by macro instructions are so complex that the operations must be broken down into two or more sub-operations, where each of the sub-operations is prescribed by a corresponding micro instruction. Thus, when the translate stage 102 is provided with one of this type of macro instructions, the pipeline stages prior to the translate stage 102 must be stalled while the translate stage 102 generates micro instructions to accomplish the complex operation. If a particular operation prescribed by a macro instruction can be implemented via a single micro instruction that can proceed unimpeded through the pipeline, then the prescribed operation is referred to as a single-cycle operation. If the particular operation requires, say, three micro instructions, then it is referred to as a 3-cycle operation. Clearly, it is advantageous to reduce the number of micro instructions that are required to implement an operation that is prescribed by a macro instruction.

Operations, or functions, that are prescribed by macro instructions are deemed complex for many reasons. One particular reason for complexity that is addressed by the present invention is due to the architectural layout, or allocation, of logic functions in conventional pipeline microprocessors. For instance, if a macro instruction prescribes an operation that requires more than one mutually exclusive sub-operation to be performed in a particular pipeline stage 101–106, then the macro instruction has to be broken down into corresponding micro instructions, each prescribing one of the mutually exclusive sub-operations. Accordingly, a first micro instruction directs the particular pipeline stage 101–106 to perform a first mutually exclusive sub-operation. The first micro instruction is followed by a second micro instruction that directs the particular pipeline stage 101–106 to perform a second mutually exclusive sub-operation. And the generation of subsequent micro instructions continues until all of the mutually exclusive sub-operations have been directed and executed.

A particular example of the multiple micro instruction problem described above has been observed by the present inventors and will now be described with reference to FIG. 2.

Figure 2:
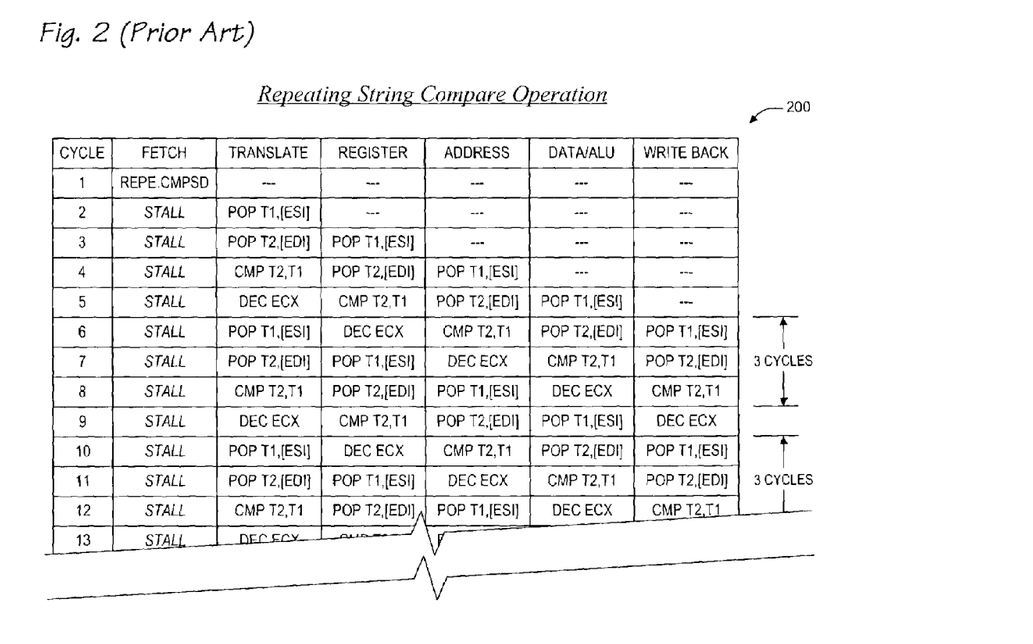
FIG. 2 is a table depicting execution of repeating string compare operation by the microprocessor of FIG. 1.

Referring to FIG. 2, a table 200 is presented depicting execution of repeating compare string instruction by the microprocessor 100 of FIG. 1. The table 200 has seven columns, one for each of the pipeline stages 101–106 discussed above with reference to FIG. 1 along with a CYCLE column, that indicates pipeline cycles associated with the propagation of instructions through the pipeline stages 101–106 of the microprocessor 100. The numbers in the CYCLE column refer to sequential pipeline cycles, each of which corresponds to a specific number of cycles of a pipeline, or core, clock signal (not shown) within the microprocessor 100. One skilled in the art will appreciate that in a present day pipeline microprocessor 100, generally speaking, one pipeline cycle corresponds to one core clock cycle. Instructions of interest to the present discussion are depicted explicitly in the FETCH-WRTIE BACK columns; preceding and following instructions which are not relevant to the present discussion are depicted as "---." A stall in the microprocessor pipeline is designated as "STALL." A stall occurs when a particular pipeline stage 101–106 is precluded from performing its designated function for the corresponding pipeline cycle.

The example of FIG. 2 is presented to describe limitations of a conventional microprocessor 100 that result in the requirement for generation of multiple micro instructions to accomplish mutually exclusive sub-operations associated with an operation prescribed by a particular macro instruction, CMPSD The particular macro instruction, CMPSD, is compare string macro instruction according to architectural conventions commensurate with an x86-compatible microprocessor and for purposes of illustration, the CMPSD macro instruction is preceded with an x86 repeat if equal prefix, REPE. x86 conventions are employed in this example because x86-compatible microprocessors and their associated macro instructions are widely understood in the industry, however, one skilled in the art will appreciate that the problem discussed below is prevalent in microprocessor architectures other than x86.

During cycle 1, logic in the fetch stage 101 of the microprocessor 100 retrieves, or fetches, the repeat-prefixed compare string macro instruction, REPE.CMPSD, from instruction memory 109. One skilled in the art will appreciate that the term "memory," 109 as used herein in the context of a pipeline microprocessing system, applies to any form of programmable or intermediate program storage media, to include disk, read-only memory (ROM), random access memory (RAM), off-chip and on-chip cache memory, etc. A macro opcode, CMPSD, directs the microprocessor 100 to perform a comparison of two operands. The two operands are located in data memory 110. A first operand is located at a first operand address prescribed by the contents of register ESI 107 and a second operand is located at a second operand address prescribed by the contents of register EDI 107. The number of iterations of the comparison is prescribed within register ECX 107. At the end of a first iteration, after the first and second operands are compared, REPE.CMPSD directs the microprocessor 100 to update bits within the flags register FLAGS 108 to describe attributes of the comparison result such as whether or not it is equal to zero (indicated by a zero flag (not shown) within the flags register FLAGS 108) or whether or not the result generated a carry (indicated by a carry flag (not shown) within the flags register FLAGS 108). In this particular example, the repeat if equal prefix, REPE, checks the state of the zero flag and terminates the iterations if the zero flag indicates that the two compared operands are not equal. Hence, repeating compare string instructions are very powerful because they enable a programmer to direct the microprocessor to compare two areas of memory 110 and to quickly determine whether the areas contain the same data, or not.

A repeating compare string instruction, REPE.CMPSD, compares to blocks of data memory 110 to determine if they are equal or not. A repeating scan string instruction, REPE.SCASD, directs the microprocessor 100 to scan through a block of data 110 whose initial address is prescribed by register ESI 107 for a number of iterations prescribed via register ECX 107 and to compare the block of data 110 to contents of register EAX 107. Hence, a compare string operation compares two operands located in memory 110, a scan string operation compares an operand in memory 110 with contents of a register, EAX 107. Following a first comparison, the contents of the string pointer registers (i.e., ESI 107 in the case of a scan string operation; ESI 107 and EDI 107 in the case of a compare string operation) are incremented or decremented according to the number of bytes prescribed for the comparison to point to new data entities within each string for a next iteration of the string compare or string scan operation. In an x86-compatible microprocessor, a direction flag (not shown) within FLAGS 108 determines whether the string pointer registers are incremented or decremented. Furthermore, following each iteration, the contents of register ECX are decremented. Repeating string scan and string compare iterations terminate when a count register (ECX 107) is decremented to zero or when a qualification for repeating is not met. In the example of FIG. 2, if the zero flag indicates that two compare operands are not equal, then the repeat string compare operations terminate.

During cycle 2, the repeating compare string macro instruction, REPE.CMPSD, proceeds through the translate stage 102. Therein, the repeating compare string macro instruction, REPE.CMPSD, is translated into a repeating sequence of four micro instructions. A first micro instruction, POP T1, [ESI], directs the microprocessor 100 1) to retrieve a first address of a first operand in data memory 110 from register ESI 107, 2) to increment or decrement the contents of ESI 107 to point to a next first operand for a next iteration of the compare operation 3) to retrieve the first operand from data memory 110 using the address provided by ESI, and 4) to store the retrieved first operand in register T1 108. A second micro instruction, POP T2, [EDI], directs the microprocessor 100 1) to retrieve a second address of a second operand in data memory 110 from register EDI 107, 2) to increment or decrement the contents of EDI 107 to point to a next second operand for the next iteration of the compare operation 3) to retrieve the second operand from data memory 110 using the address provided by EDI, and 4)

to store the retrieved second operand in register T2 108. A third micro instruction, CMP T2,T1, in the repeating sequence directs the microprocessor 100 to compare the first operand stored in T1 to the second operand stored in T2, to generate a result of the comparison in the result register, RESLT 108, and to update the flags register, FLAGS 108, based on attributes of the result. In an x86-compatible processor, the contents of T2 are subtracted from T1 to generate the comparison result. One skilled in the art will, however, appreciate that other techniques can be employed to compare the two operands. For example, the contents of T1 could be subtracted from T2 to generate a comparison result. A fourth micro instruction, DEC ECX, directs the microprocessor to decrement the count register, ECX 107 to complete one iteration of the repeating sequence. Hence, to perform one iteration of the string compare operation, a first operand is fetched from data memory 110 and stored in register T1 108, a second operand is fetched from data memory 110 and stored in T2 108, and contents of T1 108 and T2 108 are compared. Finally, the count register is decremented. The repeating sequence continues until the translate stage 102 receives a signal (not shown) from the data/ALU stage 105 that the repeat qualification is not true (i.e., the zero flag indicates that the contents of RESLT 108 is not zero, in this example) or that the prescribed number of iterations has been accomplished.

The pop-compare operation prescribed by the repeat string compare macro instruction, REPE.CMPSD, must be broken down into the four micro instructions, POP T1, [ESI], POP T2, [EDI], CMP T2,T1, and DEC ECX, because two mutually exclusive sub-operations must be performed in the data/ALU stage 102 in order to perfect one full iteration. Recall from the discussion with reference to FIG. 1 that the data/ALU stage 105 either performs arithmetic, logical, or other prescribed operations to generate results using the operands retrieved from the registers 107; or accesses the data memory 110 to store or retrieve memory operands using the addresses generated in the address stage 104. And to perfect one iteration of the pop-compare operation, the data/ALU stage 105 must 1) access data memory 110 to retrieve the second operand and 2) compare the second operand to the first operand stored in T1 108 to generate a comparison result. But since the data/ALU stage 105 can only perform one of these two sub-operations during a given pipeline cycle, the two micro instructions, POP T2, [EDI] and CMP T2,T1, are required.

Hence, during cycle 2, the translate stage 102 generates the first micro instruction, POP T1, [EST]. Also during cycle 2, a STALL is provided to the fetch stage 101 to preclude fetching of subsequent instructions because the translate stage 102 requires additional pipeline cycles to generate the remaining micro instructions in the repeating sequence.

During cycle 3, the first micro instruction POP T1, [ESI], proceeds through the register stage 103. Therein, register ESI 107 is accessed to retrieve the first address of the first operand. Also during cycle 3, the translate stage 102 generates the second micro instruction, POP T2, [EDI]. Additionally during cycle 3, the STALL persists to preclude the fetch stage 101 from providing subsequent instructions to the translate stage 102.

During cycle 4, POP T1, [ESI] proceeds through the address stage 104. Therein, the first address retrieved from ESI 107 during cycle 3 is translated for presentation to the data memory 110. One skilled in the art will appreciate that present day microprocessors 100 often employ virtual addressing schemes that require translation of virtual addresses to physical addresses in order to access memory 110. Also during cycle 4, POP T2, [EDI] proceeds through the register stage 103. Therein, register EDI 107 is accessed to retrieve the second address of the second operand. In addition during cycle 4, the third micro instruction, CMP T2,T1 is generated by the translate stage 102. Also during cycle 4, the STALL persists to preclude the fetch stage 101 from providing subsequent instructions to the translate stage 102.

During cycle 5, POP T1, [ESI] proceeds through the data/ALU stage 105. Therein, the translated first address provided by the address stage 104 is employed to access the first location in memory 110 to retrieve the first operand for the pop-compare operation and the first operand is stored in register T1 108, which is accessible by following micro instructions. Also during cycle 5, POP T2, [EDI] proceeds through the address stage 104. Therein, the second address retrieved from EDI 107 during cycle 4 is translated for presentation to the data memory 110. In addition during cycle 5, the third micro instruction, CMP T2,T1, proceeds through the register stage 103. Therein, no operations are required. Moreover during cycle 5, the fourth micro instruction, DEC ECX is generated by the translate stage 102 to complete one iteration of micro instructions for the repeating string compare operation. The STALL persists to preclude the fetch stage 101 from providing subsequent instructions to the translate stage 102.

During cycle 6, POP T1, [ESI] proceeds through the write back stage 106. Therein, the contents of source register ESI 107 are incremented or decremented as they are written back into the register stage 103 and the first micro instruction, POP T1, [EST], completes execution. Also during cycle 6, POP T2, [EDI], proceeds through the data/ALU stage 105. Therein, the translated second address provided by the address stage 104 is employed to access the second location in memory 110 to retrieve the second operand for the pop-compare operation and the second operand is stored in register T2 108, which is accessible by following micro instructions. In addition during cycle 6, the third micro instruction, CMP T2,T1, proceeds through the address stage 104. Therein, no operations are required. Also during cycle 6, the fourth micro instruction, DEC ECX, proceeds through the register stage 103. Therein, contents of the count register, ECX 107, are retrieved from the register file. Moreover during cycle 6, the translate stage 102 generates a first micro instruction, POP T1, [ESI], corresponding to a second iteration of the repeating string compare operation. One skilled in the art will appreciate that write back of ESI 107 during this cycle occurs prior its contents being retrieved as directed for the second iteration of the repeating string compare operation.

During cycle 7, POP T2, [EDI] proceeds through the write back stage 106. Therein, the contents of destination register EDI 107 are incremented or decremented as they are written back into the register stage 103 and the second micro instruction, POP T1, [ESI], completes execution. Also during cycle 7, CMP T2,T1, proceeds through the data/ALU stage 105. Therein, the contents of T2 108 and T1 108 are compared and a result of the comparison is provided to the result register RESLT 108 along with the flags register FLAGS 108 being updated to reflect attributes of RESLT 108. In addition during cycle 7, the fourth micro instruction, DEC ECX, proceeds through the address stage 104. Therein, no operations are required. Moreover during cycle 7, the translate stage 102 generates a second micro instruction, POP T2, [EDI], corresponding to the second iteration of the repeating string compare operation. One skilled in the art will appreciate that write back of EDI 107 during this cycle occurs prior its contents being retrieved as directed for the second iteration of the repeating string compare operation.

During cycle 8, the fourth micro instruction, CMP T2,T1 proceeds through the write back stage. Therein, no operations are required and the first iteration of the repeating string compare operation completes.

It is notable that four micro instructions are required to perfect one iteration of a repeating string compare operation as described herein. One of those instructions, DEC ECX, is necessary to maintain a proper iteration count, but the other three micro instructions, POP T1, [ESI], POP T2, [EDI], CMP T2,T1, are required to load the two operands from memory 110 and to perform the comparison. More specifically, the architecture of the microprocessor 100 precludes the data/ALU stage 105 from performing an operand load and a compare operation. Hence, the second operand stored at the second location pointed to by EDI 107 must be provided to register T2 108 and then a following instruction, CMP T2,T1 must be generated to compare the first and second operands.

The present inventors have noted that repeating string compare and repeating string scan operations are widely employed in present day application programs for desktop or laptop computers. Consequently, the pipeline inefficiencies discussed above with reference to FIGS. 1 and 2 result in slower execution, which is disadvantageous from a user perspective. In the case of a repeating string scan operation, only one operand must is fetched from data memory 110; the other operand is stored in register EAX 107. Hence, to iterate a repeating scan string operation, the second micro instruction, POP T2, [EDI], would be eliminated from the sequence and the CMP T2,T1 micro instruction would be replaced by CMP EAX,T1. Yet even in the case of a repeating scan string operation, the architectural problems still preclude the first operand prescribed by ESI 107 from being loaded from memory 110 and compared to the contents of EAX 107 during the same pipeline cycle. Accordingly, the present invention is presented to overcome the aforementioned problems. The present invention, now discussed with reference to FIGS. 3 and 4, enables removal of a micro instruction from micro instruction sequences for repeat pop-compare operations by virtue of a novel allocation of functions and corresponding logic within a microprocessor pipeline along with an associated pop-compare micro instruction that exploits these novel pipeline features.

Figure 3:
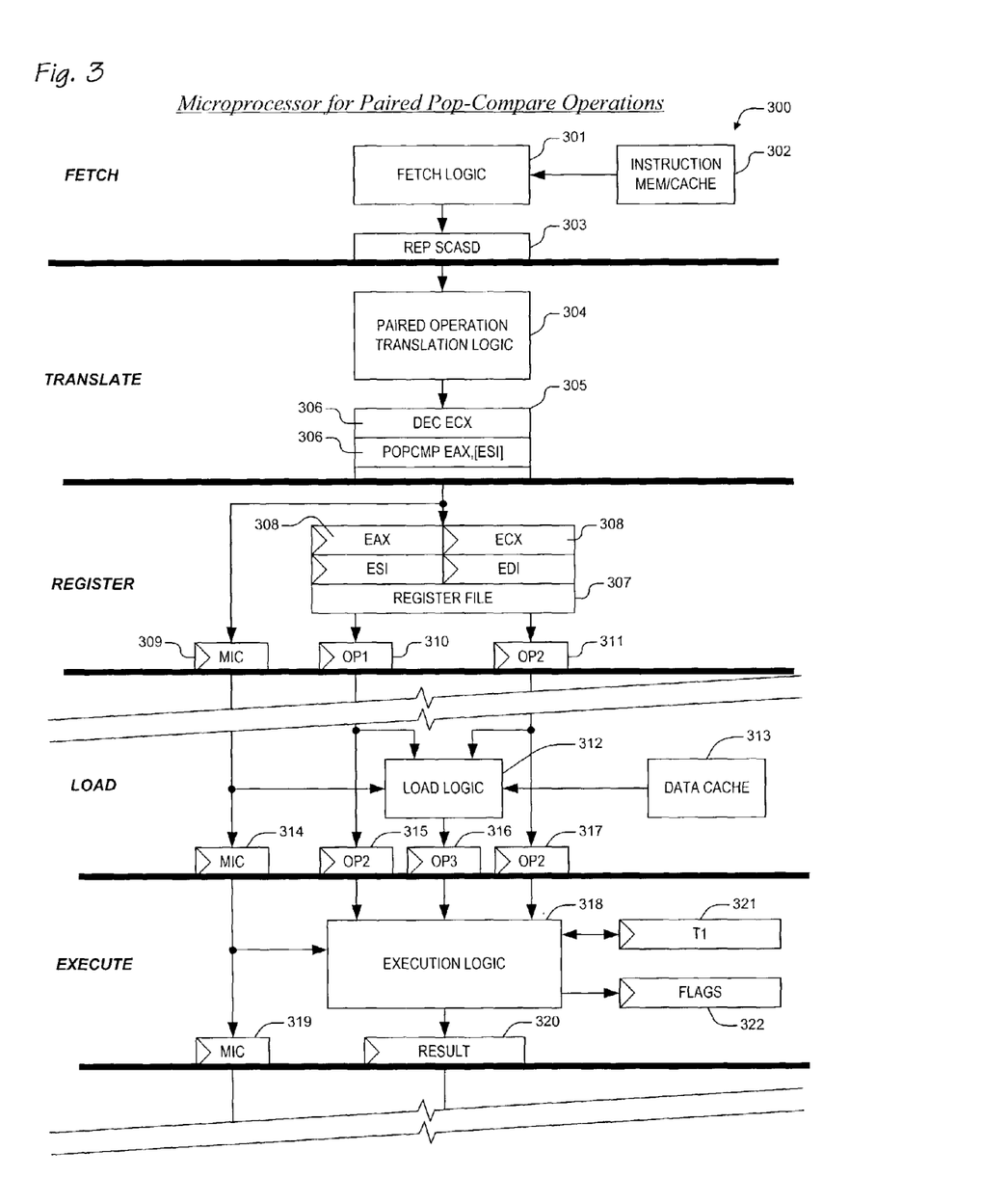
FIG. 3 is a block diagram featuring a microprocessor for paired load-compare and pop-compare operations according to the present invention.

Turning now to FIG. 3, a block diagram is presented featuring a microprocessor 300 for paired load-compare or pop-compare operations according to the present invention. The microprocessor has a fetch stage that includes fetch logic 301, a translate stage that includes paired operation translation logic 304 along with a micro instruction queue 305, a register stage that has a register file 307, a load stage including load logic 312, and an execute stage that includes execution logic 318. For clarity purposes, stages preceding the load stage (e.g., an address stage) and following the execute stage (e.g., a write back stage) are not shown. In contrast to the conventional microprocessor 100 discussed with reference to FIGS. 1–2, the microprocessor 300 according to the present invention has allocated memory retrieval functions to a load stage for loading operands from data memory 313 that is separate from an execute stage provided to perform arithmetic and logical functions. The microprocessor 300 also includes paired operation translation logic 304 that advantageously exploits the separate load and execute stages in order to reduce the number of pipeline cycles that are required for execution of paired load-compare and pop-compare functions, such as are required to load and compare operands when executing operations prescribed by compare string or scan string macro instructions.

Operationally, the fetch logic 301 fetches macro instructions from external memory 302 or instruction cache 302 and provides these macro instructions to an instruction buffer 303. The paired operation translation logic 304 receives the macro instructions from the instruction buffer 303 and translates the macro instructions into a corresponding sequence of micro instructions that direct the microprocessor 300 to accomplish the operations prescribed by the macro instructions. Each generated micro instruction is provided in sequence to a queue buffer 306 in the micro instruction queue.

If a scan string macro instruction or a compare string macro instruction is received from the instruction buffer 303 (an exemplary repeating scan string macro instruction, REP.SCASD, is shown in the buffer 303 for illustrative purposes), then the paired operation translation logic translates the macro instruction into a corresponding sequence of micro instructions to accomplish the prescribed operation. For a single scan string macro instruction or a single compare string macro instruction, one micro instruction within the corresponding sequence comprises a load-compare micro instruction, LDCMP XX, [ESI], directing the microprocessor to load an operand from data cache 303, where the address of the operand is pointed to by the contents of register ESI 308 (or register EDI 308, if so specified), and to compare the operand with a second operand stored in an internal register 308, 321. In the case of a single scan string macro instruction, SCASD, the internal register 308 is within the register file 307. In the case of a compare string macro instruction, CMPSD, the internal register 321 is accessible by execution logic and contains a second operand that has been previously retrieved from data memory 313. If a repeat prefix is provided for either the scan string macro instruction, REP.SCASD, or the compare string macro instruction, REP.CMPSD, then the one micro instruction within the corresponding sequence comprises a pop-compare micro instruction, POPCMP XX, [ESI], that directs the microprocessor 300 to perform the same operations as the load-compare micro instruction described above, but in addition, directing that the contents of a pointer register (i.e., register ESI 308 or EDI 308) be incremented or decremented for each iteration and that contents of a counter register, ECX 308, be decremented as well. In one embodiment, register file logic 307 increments or decrements the aforementioned registers 308. In an alternative embodiment, explicit micro instructions are issued to increment or decrement the registers 308 for each prescribed iteration.

It is possible to prescribe a paired pop-compare task by a single micro instruction according to the present invention because retrieval of memory data (i.e., the first operand) and comparison of the first operand with a second operand in the execute stage are no longer mutually exclusive operations. In fact, although a pop-compare operation is employed as a vehicle to describe aspects of the present invention, one skilled in the art will appreciate that the scope of the present invention contemplates any form of paired load-execute functions, such as a load-arithmetic, load-logical, or load-jump, where an operand required for computation in the function must first be retrieved from memory 313.

The register stage retrieves micro instructions in order from the queue positions 306 in the micro instruction queue 305. If a retrieved micro instruction directs access to registers 308 within the register file 307, then the register file 307 accesses the prescribed registers 308 and provides their contents in operand registers 310, 311. In addition, micro instructions are forwarded to the next pipeline stage in micro instruction buffer 309.

Micro instructions and associated operands are forwarded down through subsequent stages until they reach the load stage, wherein the load logic 312 is employed to access the data cache 313 to retrieve data, if so prescribed by the micro instruction. The load logic 312 retrieves the data from the data cache 313 and provides it in a retrieved operand buffer 316 for access by the execution logic 318. The register operands are also forwarded to the execute stage in operand 1 buffer 315 and operand 2 buffer 317. Additionally, the micro instruction and other relevant information are forwarded to the execute stage in micro instruction buffer 314. In the particular case of a pop-compare micro instruction, POPCMP, according to the present invention, the load logic 312 accesses the data cache 313 to retrieve an operand the pop-compare operation and the operand is provided for access by execute logic 318 in the operand 3 buffer 316.

The execution logic 318 receives the micro instruction from micro instruction buffer 314 along with associated operand data from operand buffers 315–317 and performs prescribed operations to produce a result which is then provided to a result register 320. In addition, the micro instruction and associated information is forwarded to following stages via micro instruction buffer 319. In the particular case of a pop-compare micro instruction, POPCMP, the execution logic 318 receives the operand from operand 3 buffer 316 and compares it to a second operand that is either 1) provided from a register file register 308 (in the case of a scan string operation) or 2) provided from register T1 321 (in the case of a compare string operation where a previous load micro instruction has directed the microprocessor 300 to load the second operand from memory 313 and store it in T1 321). The result of the compare operation is provided to the result register 320 and a flags register, FLAGS 322, is updated to reflect attributes of the result. In one embodiment, the scan string instruction is an x86 scan string macro instruction, and the comparison operation comprises taking the difference between a first operand stored in architectural register EAX 308 and a second operand retrieved from data memory 313 and pointed to by contents of architectural register EDI 308. In another embodiment, the compare string instruction is an x86 compare string macro instruction, and the comparison operation comprises taking the difference between a first operand retrieved from data memory 313 and pointed to by contents of architectural register ESI 308 and a second operand retrieved from data memory 313 and pointed to by contents of architectural register EDI 308.

Figure 4:
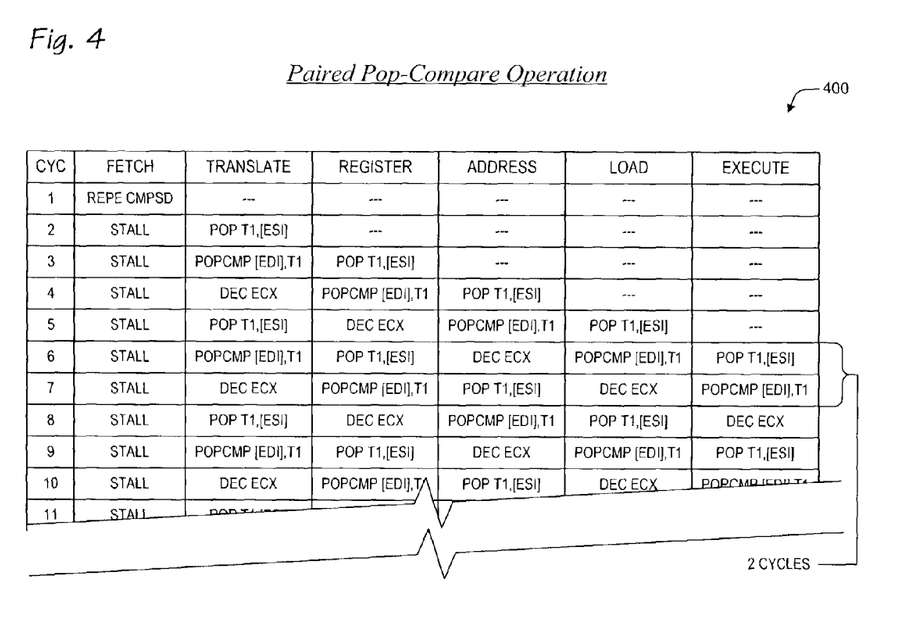
FIG. 4 is a table showing execution of a repeating pop-compare operation by the microprocessor of FIG. 3.

Now turning to FIG. 4, a table 400 is provided showing execution of a repeating compare string macro instruction by the microprocessor 300 of FIG. 3. The table 400 has seven columns, one for each of the relevant pipeline stages discussed above with reference to FIG. 3 along with a CYCLE column, that indicates pipeline cycles associated with the propagation of instructions through the pipeline stages of the microprocessor 300. Although an address stage is not depicted in the block diagram of FIG. 3 for clarity purposes, an ADDRESS stage column is shown in the table 400 to describe progression of micro instructions of interest. Also, for clarity purposes, only those stages up through the execute stage of the microprocessor 300 according to the present invention are depicted in the table 400. As was similarly discussed above with reference to the table 200 of FIG. 2, instructions of interest are depicted explicitly in the FETCH-EXECUTE columns; preceding and following instructions which are not relevant to the present discussion are depicted as "---."

The example of FIG. 4 is presented to describe how a pipeline microprocessor 300 according to the present invention overcomes the limitations of a conventional microprocessor 100 that result in the requirement for generation of multiple micro instructions to accomplish mutually exclusive sub-operations. In the example of FIG. 4, these sub-operations are associated with an operation prescribed by a particular x86 repeating compare string macro instruction, REPE.CMPSD, however, particular macro instruction is employed merely to exemplify aspects of the present invention. It is contemplated that novel features and aspects of the present invention are applicable to other microprocessor instruction set architectures and complex macro instructions wherein computations following load of an operand are required.

During cycle 1, the fetch logic 301 retrieves, or fetches, the repeat-prefixed compare string macro instruction, REPE.CMPSD, from instruction memory 302. As noted above in the discussion with reference to FIG. 2, the term "memory," 302 as used herein in the context of a pipeline microprocessing system, applies to any form of programmable or intermediate program storage media, to include disk, read-only memory (ROM), random access memory (RAM), off-chip and on-chip cache memory, etc. A macro opcode, CMPSD, directs the microprocessor 300 to perform a comparison of two operands. The two operands are located in data memory 313. A first operand is located at a first operand address prescribed by the contents of register ESI 308 and a second operand is located at a second operand address prescribed by the contents of register EDI 308. The number of iterations of the comparison is prescribed within register ECX 308. At the end of a first iteration, after the first and second operands are compared, REPE.CMPSD directs the microprocessor 300 to update bits within the flags register FLAGS 322 to describe attributes of the comparison result such as whether or not it is equal to zero (indicated by a zero flag (not shown) within the flags register FLAGS 322), or whether or not the result generated a carry (indicated by a carry flag (not shown) within the flags register FLAGS 322), or whether or not the result generated an overflow (indicated by an overflow flag within FLAGS 322). In this particular example, the repeat if equal prefix, REPE, checks the state of the zero flag and terminates the iterations if the zero flag indicates that the two compared operands are not equal.

A repeating compare string instruction, REPE.CMPSD, compares to blocks of data memory 313 to determine if they are equal or not. A repeating scan string instruction, REPE.SCASD, directs the microprocessor 300 to scan through a block of data 313 whose initial address is prescribed by register EST 308 for a number of iterations prescribed via register ECX 308 and to compare the block of data 313 to contents of register EAX 308. Following a first comparison, the contents of the string pointer registers (i.e., ESI 308 in the case of a scan string operation; EST 308 and EDT 308 in the case of a compare string operation) are incremented or decremented according to the number of bytes prescribed for the comparison to point to new data entities within each string for a next iteration of the string compare or string scan operation. In an x86-compatible microprocessor, a direction flag (not shown) within FLAGS 108 determines whether the string pointer registers are incremented or decremented. In addition, in a x86-compatible microprocessor, specific encoding of the scan string instruction or the compare string instruction directs the microprocessor to compare bytes, words, or double words, thus determining the amount by which the string pointer registers 308 are to be incremented or decremented. Furthermore, the contents of register ECX are decremented in accordance with each iteration. Repeating string scan and string compare iterations terminate when register ECX 308 is decremented to zero or when a qualification for repeating is not met. In this example, if the zero flag indicates that two compare operands are not equal, then the repeat string compare operations terminate.

During cycle 2, the repeating compare string macro instruction, REPE.CMPSD, proceeds through the translate stage 102. Therein, the repeating compare string macro instruction, REPE.CMPSD, is translated into a repeating sequence of three micro instructions. A first micro instruction, POP T1, [ESI], directs the microprocessor 300 1) to retrieve a first address of a first operand in data memory 313 from register EST 308, 2) to increment or decrement the contents of ESI 308 to point to a next first operand for a next iteration of the compare operation, 3) to retrieve the first operand from data memory 313 using the address provided by ESI 308, and 4) to store the retrieved first operand in register T1 321. A second micro instruction, POPCMP [EDI],T1, directs the microprocessor 300 1) to retrieve a second address of a second operand in data memory 313 from register EDT 308, 2) to increment or decrement the contents of EDI 308 to point to a next second operand for the next iteration of the compare operation, 3) to retrieve the second operand from data memory 313 using the address provided by EDT 308, 4) to compare the retrieved second operand to the first operand stored in register T1 321, 5) and to generate a result of the comparison in the result register, RESLT 320 and update the flags register, FLAGS 322, based on attributes of the result. In one embodiment, the difference of the two operands is taken to generate the comparison result. A third micro instruction, DEC ECX, directs the microprocessor 300 to decrement the count register, ECX 308 to complete one iteration of the repeating sequence. In one embodiment, an explicit micro instruction, DEC ECX, is employed to direct the microprocessor 300 to decrement the count register 308. In an alternative embodiment, the count register, ECX 308 is automatically decremented during each iteration as directed by the micro opcode, POPCMP, or the pop-compare micro instruction, POPCMP [EDI],T1. The repeating sequence continues until the translation logic 304 receives a signal (not shown) from the execution logic 318 that the repeat qualification is not true (i.e., the zero flag indicates that the contents of RESLT 320 is not zero, in this example) or that the prescribed number of iterations has been accomplished.

In contrast to a conventional microprocessor 100, the microprocessor 300 according to the present invention only requires that pop-compare operation prescribed by the repeat string compare macro instruction, REPE.CMPSD, be broken down into three micro instructions, POP T1, [ESI], POPCMP [EDI],T1, and DEC ECX, load and compare operations are no longer mutually exclusive since they are allocated to different stages (i.e., load stage and execute stage). Thus, pop-compare operations become single-cycle operations when executed on a microprocessor 300 according to the present invention. A pop-compare operation is referred to as a single-cycle operation because the operation is accomplished by a single pop-compare micro instruction, POPCMP, that proceeds through each stage of a microprocessor 300 according to the present invention in a single pipeline cycle.

Hence, during cycle 2, the paired operation translator 304 generates the first micro instruction, POP T1, [ESI]. Also during cycle 2, a STALL is provided to the fetch logic 301 to preclude fetching of subsequent instructions because the translation logic 304 requires additional pipeline cycles to generate the remaining micro instructions in the repeating sequence.

During cycle 3, the first micro instruction POP T1, [ESI], proceeds through the register stage. Therein, register ESI 308 is accessed to retrieve the first address of the first operand. Also during cycle 3, the translate stage 102 generates the pop-compare micro instruction, POPCMP [EDI], T1. Additionally during cycle 3, the STALL persists to preclude the fetch logic 301 from providing subsequent instructions to the translator 304.

During cycle 4, POP T1, [EST] proceeds through the address stage (not shown in FIG. 3). Therein, the first address retrieved from ESI 308 during cycle 3 is translated for presentation to the data memory 313, like the similar operation described with reference to the example of FIG. 2. Also during cycle 4, the pop-compare micro instruction, POPCMP [EDI],T1 proceeds through the register stage. Therein, register EDI 308 is accessed to retrieve the second address of the second operand. In addition during cycle 4, the third micro instruction, DEC ECX, is generated by the paired operation translation logic 304. Also during cycle 4, the STALL persists to preclude the fetch logic 304 from providing subsequent instructions to the translation logic 304.

During cycle 5, POP T1, [ESI] proceeds through the load stage. Therein, the translated first address provided by the address stage is employed by load logic 312 to access the first location in memory 313 to retrieve the first operand for the pop-compare operation and the first operand is forwarded to the execute stage in operand buffer 3 316. Also during cycle 5, POPCMP [EDI],T1 proceeds through the address stage. Therein, the second address retrieved from EDI 308 during cycle 4 is translated for presentation to the data memory 313. In addition during cycle 5, the third micro instruction, DEC ECX, proceeds through the register stage. Therein, contents of register ECX 308 are retrieved from the register file 307 and provided to one of the register operand registers 310, 311. In one embodiment, the contents of ECX 308 are forwarded to the execution logic 318 for decrementing and write back to register ECX 308. In another embodiment, the register logic 307 is configured to decrement ECX 308 without a requirement for forwarding to the execution logic 318. And, as noted above, a third embodiment of the present invention implicitly contains a provision for auto-decrementing ECX 308 within the opcode, POPCMP, of the pop-compare micro instruction. Moreover during cycle 5, the translation logic 304 generates a first micro instruction, POP T1, [ESI], corresponding to a second iteration of the repeating string compare operation. One skilled in the art will appreciate that incremented (or decremented) contents of register ESI 308 are available by virtue of embodiments discussed herein, or by well-known bypass bus techniques for forwarding results of one stage to previous stages. Also during cycle 5, the STALL persists to preclude the fetch logic 301 from providing subsequent instructions to the translation logic 304.

During cycle 6, POP T1, [ESI] proceeds through the execute stage of the microprocessor 300. Therein, the execution logic 318 retrieves the first operand from buffer 316 and stores it for comparison during the following pipeline cycle in register T1 321. Also during cycle 6, POPCMP [EDI],T1 proceeds through the load stage. Therein, the translated second address provided by the address stage is employed to access the second location in memory 313 to retrieve the second operand for the pop-compare operation and the second operand is forwarded to the execution logic 318 in buffer 316. In addition during cycle 6, the third micro instruction, DEC ECX, proceeds through the address stage 104. Moreover during cycle 6, the first micro instruction corresponding to the second iteration proceeds through the register stage and the translation logic 304 generates a second pop-compare micro instruction, POPCMP [EDT], T1, corresponding to the second iteration of the repeating string compare operation.

During cycle 7, POPCMP [EDI],T1 proceeds through the execute stage. Therein, the execution logic 318 retrieves the first operand from register T1 321 and the second operand from buffer 316 and compares the two operands. The result of the comparison is provided to the result register 320 and FLAGS 322 is updated, thus completing the first iteration of the compare string operation. Also during cycle 7, DEC ECX proceeds through the load stage. Therein, no operations are required. In addition during cycle 7, micro instructions corresponding to the second iteration of the compare string operation proceed through the translate, register, and address stages.

During subsequent cycles of the pipeline clock, micro instructions corresponding to subsequent iterations of the repeating compare string operation propagate through the successive stages of the microprocessor 300 according to the present invention until the repeat qualifier is not true or until the count register ECX 308 reaches zero.

In contrast to a conventional microprocessor 100, performing a repeating compare string or scan string operation according to the present invention does not require additional register storage (such as register T2 in the example of FIG. 2). And a single-micro instruction, POPCMP, is employed to perform a paired pop-compare operation in a single pipeline cycle, thus improving the overall efficiency of compare string and scan string operations.

Although the present invention and its objects, features, and advantages have been described in detail, other embodiments are encompassed by the invention as well. For example, it is noted above that the number of micro instructions and commensurate pipeline cycles that are required to execute a single or repeating scan string or compare string operation are significantly reduced by employing advantageous aspects of the present invention. However, any type of load-execute operation, such as a load-add, load-subtract, load-logical, will experience the same advantages.

In addition, although macro instructions according to an x86-compatible microprocessor architecture are employed for teaching purposes, one skilled in the art will appreciate that the present invention comprehends any pipeline architecture whose pipeline stages relegate load and execute functions to two sequential sub-operations.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. A microprocessor apparatus for performing a pop-compare operation, comprising:
    paired operation translation logic, for receiving a macro instruction that prescribes the pop-compare operation, and for generating a pop-compare micro instruction, wherein said pop-compare micro instruction directs pipeline stages in a microprocessor to perform the pop-compare operation;
    load logic, coupled to said paired operation translation logic, for receiving said pop-compare micro instruction, and for retrieving a first operand from an address in memory, wherein said address is specified by contents of a register, said register being prescribed by said pop-compare micro instruction; and
    execution logic, coupled to said load logic, for receiving said first operand, and for comparing said first operand to a second operand.

2. The microprocessor as recited in claim 1, wherein said pop-compare micro instruction directs said load logic to retrieve said first operand and directs said execution logic to compare said first operand to said second operand.

3. The microprocessor as recited in claim 1, wherein said load logic comprises a first one of said pipeline stages and said execution logic comprises a second one of said pipeline stages, and wherein said second one of said pipeline stages follows said first one of said pipeline stages.

4. The microprocessor as recited in claim 3, wherein said pop-compare micro instruction proceeds through said first one of said pipeline stages in single pipeline cycle.

5. The microprocessor as recited in claim 4, wherein said pop-compare micro instruction proceeds through said second one of said pipeline stages in a single pipeline cycle.

6. The microprocessor as recited in claim 5, wherein said first pipeline stage forwards said first operand and said pop-compare micro instruction to said second pipeline stage for comparison of said first operand with said second operand.

7. The microprocessor as recited in claim 1, wherein said execution logic updates a flags register according to a result of comparing said first operand to said second operand.

8. The microprocessor as recited in claim 7, wherein said flags register comprises a zero flag, a carry flag, and an overflow flag.

9. The microprocessor as recited in claim 1, wherein said execution logic additionally increments or decrements said contents of said register so that said contents will point to a next address in said memory for comparison by said execution logic during a next pop-compare operation.

10. The microprocessor as recited in claim 1, wherein said macro instruction comprises an x86 compare string macro instruction.

11. The microprocessor as recited in claim 1, wherein said macro instruction comprises an x86 scan string macro instruction.

12. Apparatus in a microprocessor for executing a scan string instruction or a compare string instruction, comprising:
    a paired operation translator, configured to translate the scan string instruction or the compare string instruction into corresponding micro instructions, wherein said corresponding micro instructions comprise a pop-compare micro instruction directing the microprocessor to perform two operations, and wherein said two operations are performed by two successive stages of the microprocessor, said two successive stages comprising:
        a load stage, configured to perform a first one of said two operations, said first one of said two operations comprising retrieving a first operand from a location in memory; and
        an execute stage, coupled to said load stage, configured to perform a second one of said two operations, said second one of said two operations comprising receiving said first operand and comparing said first operand with a second operand to generate a result.

13. The apparatus as recited in claim 12, wherein said execute stage follows said load stage in the microprocessor.

14. The apparatus as recited in claim 12, wherein said pop-compare micro instruction proceeds through said load stage in single pipeline cycle.

15. The apparatus as recited in claim 12, wherein said pop-compare micro instruction proceeds through said execute stage in a single pipeline cycle.

16. The apparatus as recited in claim 12, wherein said load stage forwards said first operand along with said pop-compare micro instruction to said execute stage for comparison of said first operand with said second operand.

17. The apparatus as recited in claim 16, wherein said execute stage updates a flags register according to said result.

18. The apparatus as recited in claim 12, wherein said execute stage increments or decrements contents of a register so that said contents will point to a next address in said memory, said address in said memory having a next operand stored therein, said next operand to be compared by said execute stage during a next pop-compare operation.

19. The apparatus as recited in claim 12, wherein the compare string instruction and the scan string instruction comprise x86 macro instructions.

20. The apparatus as recited in claim 12, wherein said location is specified by contents of a register within the microprocessor, and wherein the compare string instruction or the scan string instruction prescribes said register.

21. A mechanism in a pipeline microprocessor for performing a pop-compare operation, comprising:

a pop-compare micro instruction, said pop-compare micro instruction corresponding to a macro instruction received and translated by translation logic; and load logic, configured to receive said pop-compare micro instruction, to retrieve a first operand from a memory location, and to provide said first operand to execution logic in a following stage of the pipeline microprocessor, wherein said execution logic compares said first operand to a second operand to generate a comparison result in a single pipeline cycle.

22. The mechanism as recited in claim 21, wherein said pop-compare micro instruction directs said load logic to retrieve said first operand and also directs said execution logic to compare said first operand with said second operand.

23. The mechanism as recited in claim 21, wherein said pop-compare micro instruction proceeds through said load stage in single pipeline cycle.

24. The mechanism as recited in claim 21, wherein said macro instruction comprises an x86 scan string instruction or an x86 compare string instruction.

25. The mechanism as recited in claim 21, wherein said memory location is stored in a register, and wherein said macro instruction prescribes said register.

* * * * *